United States Patent
O'Neil et al.

(10) Patent No.: US 9,106,622 B2
(45) Date of Patent: *Aug. 11, 2015

(54) NETWORK-BASED SERVICE FOR SECURE ELECTRONIC MAIL DELIVERY ON AN INTERNET PROTOCOL NETWORK

(71) Applicant: AT&T Intellectual Property II, L.P., Atlanta, GA (US)

(72) Inventors: Joseph Thomas O'Neil, Staten Island, NY (US); Kenneth H. Rosen, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,444

(22) Filed: Jan. 29, 2014

(65) Prior Publication Data

US 2014/0208106 A1 Jul. 24, 2014

Related U.S. Application Data

(63) Continuation of application No. 09/458,982, filed on Dec. 10, 1999, now Pat. No. 8,676,896.

(51) Int. Cl.
*G06F 15/16* (2006.01)
*H04L 29/06* (2006.01)
*H04L 12/58* (2006.01)

(52) U.S. Cl.
CPC ............ *H04L 63/0428* (2013.01); *H04L 12/58* (2013.01); *H04L 51/14* (2013.01)

(58) Field of Classification Search
CPC ........................... H04L 12/58; H04L 63/0428

USPC .................................................... 709/201.206
See application file for complete search history.

(56) References Cited

U.S. PATENT DOCUMENTS

| 5,303,303 | A | * | 4/1994 | White ........................... 713/160 |
| 5,956,400 | A | * | 9/1999 | Chaum et al. .................. 713/167 |
| 6,021,203 | A | | 2/2000 | Douceur et al. |
| 6,085,178 | A | * | 7/2000 | Bigus et al. ..................... 705/80 |
| 6,334,118 | B1 | | 12/2001 | Benson |

(Continued)

*Primary Examiner* — Larry Donaghue
(74) *Attorney, Agent, or Firm* — Chiesa Shahinian & Giantomasi PC

(57) ABSTRACT

A network is disclosed that includes a message originator computer and a message recipient computer, for secure electronic mail delivery. In accordance with the invention, the network includes a message delivery server that can distinguish between real and phantom messages. In operation, the message originator computer waits a random time and then transmits a first encrypted phantom message to the message delivery server. This message is to spoof an eavesdropper into believing that there is a steady stream of messages being sent from the originator computer. However, the message delivery server recognizes the message as a phantom message and discards it. When the message originator computer receives a user request to transmit a real message to the recipient computer, it waits a random time and then encrypts and transmits the real message to the message delivery server. The message delivery server recognizes the message as a real message and forwards the real message to the recipient computer. Meanwhile, the message originator computer can continue transmitting encrypted phantom messages to the message delivery server. In this manner, an eavesdropper will be tricked into believing that there is a steady stream of messages being sent from the originator computer.

17 Claims, 11 Drawing Sheets

(56) References Cited

U.S. PATENT DOCUMENTS 7,010,604 B1 * 3/2006 Munger et al. ............... 709/227
7,328,457 B1 2/2008 Mister
8,676,896 B1 * 3/2014 O'Neil et al. ................. 709/206

* cited by examiner

NETWORK-BASED SERVICE FOR SECURE ELECTRONIC MAIL DELIVERY ON AN INTERNET PROTOCOL NETWORK

This application is a continuation of prior application Ser. No. 09/458,982, filed on Dec. 10, 1999, the content of which is incorporated herein by reference in its entirety.

BACKGROUND OF THE INVENTION

1. Field of the Invention

The invention disclosed broadly relates to telecommunications and more particularly relates to secure email delivery.

2. Related Art

The current art defines methods by which encrypted email may be transmitted from a sender to one or more recipients on a communications network. This provides confidentiality and prevents a computer hacker from reading the contents of that message. In addition, authentication features allow a recipient to validate that a message was actually sent by a specific individual. Pretty Good Privacy (PGP) and Privacy Enhanced Email (PEM) are examples of technologies that currently provide these features.

However, it is possible for a computer hacker to infer useful information about an email transmission by (a) looking at the time when an email is sent and (b) looking at the source and destination IP addresses. For example, an encrypted email sent by a stock broker can contain a buy or sell recommendation. Although a computer hacker cannot read the message contents, he or she can look at current news and market conditions and possibly infer the contents of the message. In addition, if a computer hacker has some knowledge of the clients of a broker, he or she can infer information by determining the source and destination of IP packets that are sent by the broker.

SUMMARY OF THE INVENTION

A network is disclosed that includes a message originator computer and a message recipient computer, for secure electronic mail delivery. In accordance with the invention, the network includes a message delivery server that can distinguish between real and phantom messages. In operation, the message originator computer waits a random time and then transmits a first encrypted phantom message to the message delivery server. The cleartext version of the message can be gibberish or innocuous information which, when encrypted, has the same general outward appearance as does an encrypted real message. One example of the cleartext version of the message is a stale message drawn from a pool of past messages sent by the originator computer, such as outdated recommendations of a securities dealer. The purpose of the phantom message is to spoof an eavesdropper into believing that there is a steady stream of messages being sent from the originator computer. However, the message delivery server recognizes the message as a phantom message and discards it. When the message originator computer receives a user request to transmit a real message to the recipient computer, it waits a random time and then encrypts and transmits the real message to the message delivery server. The message delivery server recognizes the message as a real message and forwards the real message to the recipient computer. Meanwhile, the message originator computer continues transmitting encrypted phantom messages to the message delivery server. In this manner, an eavesdropper will be tricked into believing that there is a steady stream of messages being sent from the originator computer.

Another feature of the invention is the use of phantom addresses to direct phantom messages to a pool of recipient computers that are able to recognize and discard them. The phantom address of a phantom message is meant to spoof an eavesdropper into believing that messages are being widely broadcast from the originator computer to many recipients, thereby concealing the identity of the true recipient of a real message.

There are a wide variety of network configurations of the invention. In its simplest form, the originator computer is directly connected over a communications link to the recipient computer which is able to distinguish phantom messages from real messages sent from the originator and discard the phantom messages. In another configuration, originator computer is directly connected over a plurality of communications links to a plurality of recipient computers, each of which is able to distinguish phantom messages from real messages sent from the originator and discard the phantom messages. In still another configuration, originator computer is directly connected to a gateway and sends only real messages to the gateway. The gateway sends phantom messages and forwards the real messages from the originator. The gateway, in turn is directly connected over a communications link to the recipient computer which is able to distinguish phantom messages from real messages sent from the gateway and discard the phantom messages. The gateway may be directly connected over a plurality of communications links to a plurality of recipient computers, each of which is able to distinguish phantom messages from real messages sent from the gateway and discard the phantom messages. In still another configuration, the recipient computers may be directly connected to a second gateway connected to the communications link, the second gateway forwarding only real messages to the recipients. In each of these configurations, a message delivery server that can distinguish between real and phantom messages can be a part of the communications link between the originator computer or its gateway and the recipient computer or its second gateway. The message delivery server distinguishes real messages and forwards them to the recipient computer or second gateway. Meanwhile, the message delivery server can also be transmitting encrypted phantom messages to the recipient computer or second gateway.

DESCRIPTION OF THE PREFERRED EMBODIMENTS

Figure 1A:
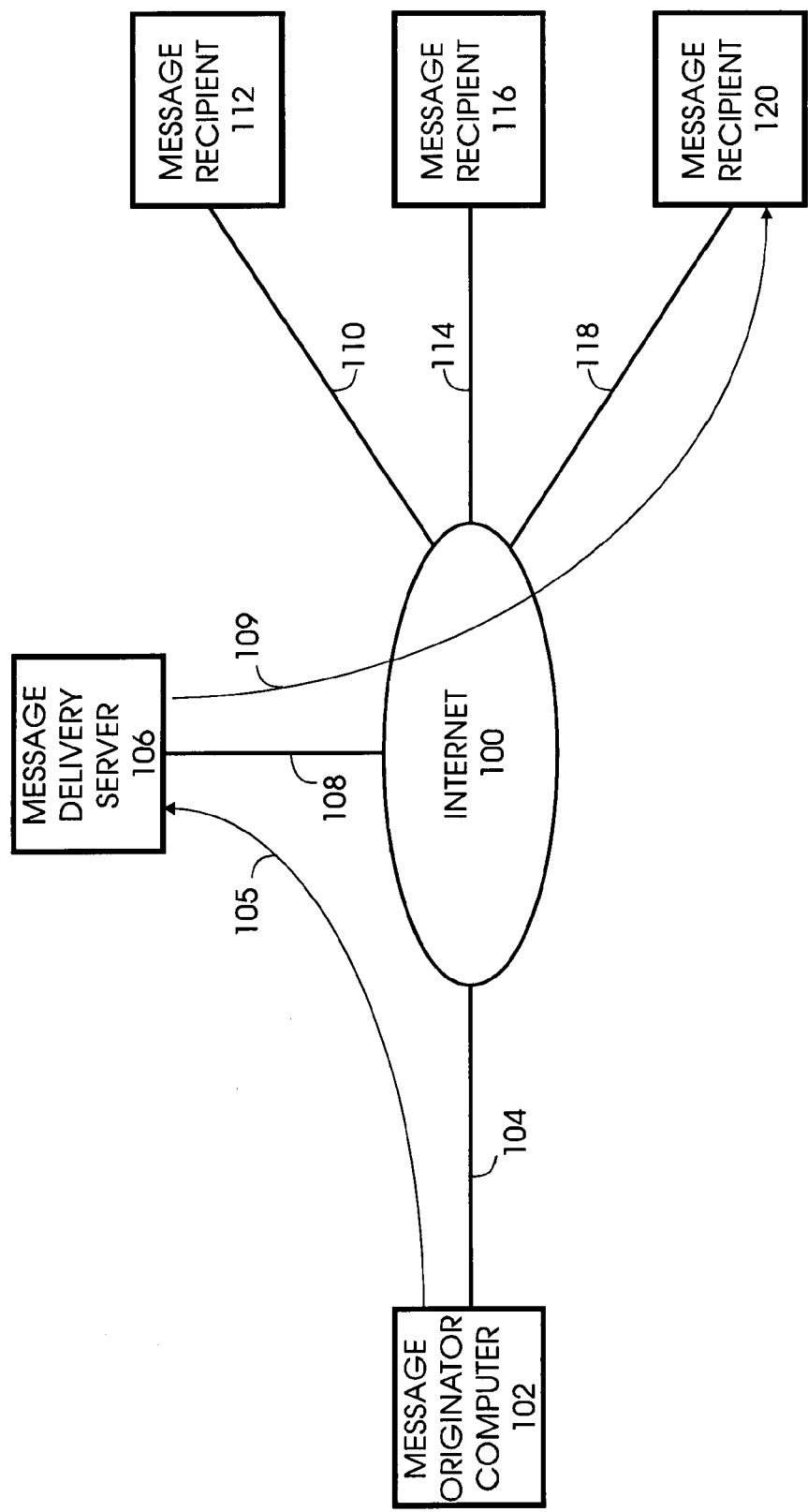
FIG. 1A is a network diagram of a first embodiment of the invention.

FIG. 1A is a network diagram of a first embodiment of the invention which includes a message originator computer 102 connected by link 104 to Internet network 100. Message recipient computers 112, 116, and 120 are connected by respective links 110, 114, and 118 to Internet network 100. In accordance with the invention, the network includes a message delivery server 106 connected by link 108 to the Internet network 100, that can distinguish between real and phantom messages. In operation, the message originator computer 102 waits a random time and then transmits a first encrypted phantom message over path 105 to the message delivery server 106. This message is to spoof an eavesdropper into believing that there is a steady stream of messages being sent from the originator computer 102. However, the message delivery server 106 recognizes the message as a phantom message and discards it. When the message originator computer 102 receives a user request to transmit a real message to the recipient computer 112, 116, or 120, the message originator computer 102 waits a random time and then encrypts and transmits the real message to the message delivery server 106. The message delivery server 106 recognizes the message as a real message and forwards the real message over path 109 to the recipient computer 120. Meanwhile, the message originator computer 102 can continue transmitting encrypted phantom messages to the message delivery server 106 to trick an eavesdropper into believing that there is a steady stream of messages being sent from the originator computer 102. In this manner a computer hacker cannot infer information from the timing of message exchanges and cannot read the contents of messages.

There are several possible formats for a "phantom" message. A phantom message can be pseudorandom numbers used to fill the content or words selected at random from a vocabulary. Alternately, a phantom message can be a sampling of stale messages that characterize the normal message traffic from the message originator computer. When the phantom message is encrypted, the eavesdropper cannot distinguish a phantom message sequence from a real message sequence by examining any differences in their overt patterns. There are several possible ways for a recipient computer 120 or a message delivery server 106 to distinguish between "phantom" and real messages. For example, a flag can be included in each cleartext message to indicate if it is a "phantom" message, or a special message pattern can be used to indicate that it is a "phantom" message. When the cleartext message is encrypted, it cannot be distinguished as either a "phantom" or a real message. The goal of these techniques is to minimize the possibility that a computer hacker can analyze the bits in these messages and distinguish between "phantom" and real messages.

The message delivery server 106 in the Internet acts as an intermediary between an originator and recipients. An originator sends an encrypted message to the message delivery server 106. The identity of the recipients is encrypted and cannot be determined by a computer hacker. In addition, it is not possible for a computer hacker to determine when a message is transmitted by an originator. This is because the originator continually sends encrypted messages at random intervals. These "phantom" messages are designed to resemble real, encrypted messages. The packets contain random bytes when there is no message to be sent. Otherwise, they contain an encrypted message. Communication between the message delivery server 106 and the recipients is safeguarded in a similar manner. The invention can be used to protect electronic mail that is sent between consumers connected to the Internet. It can also be used to safeguard electronic mail that is sent between Intranets via the Internet. Proxies on gateways connected to the Internet provide secure communication with the message delivery server 106.

Figure 1B:
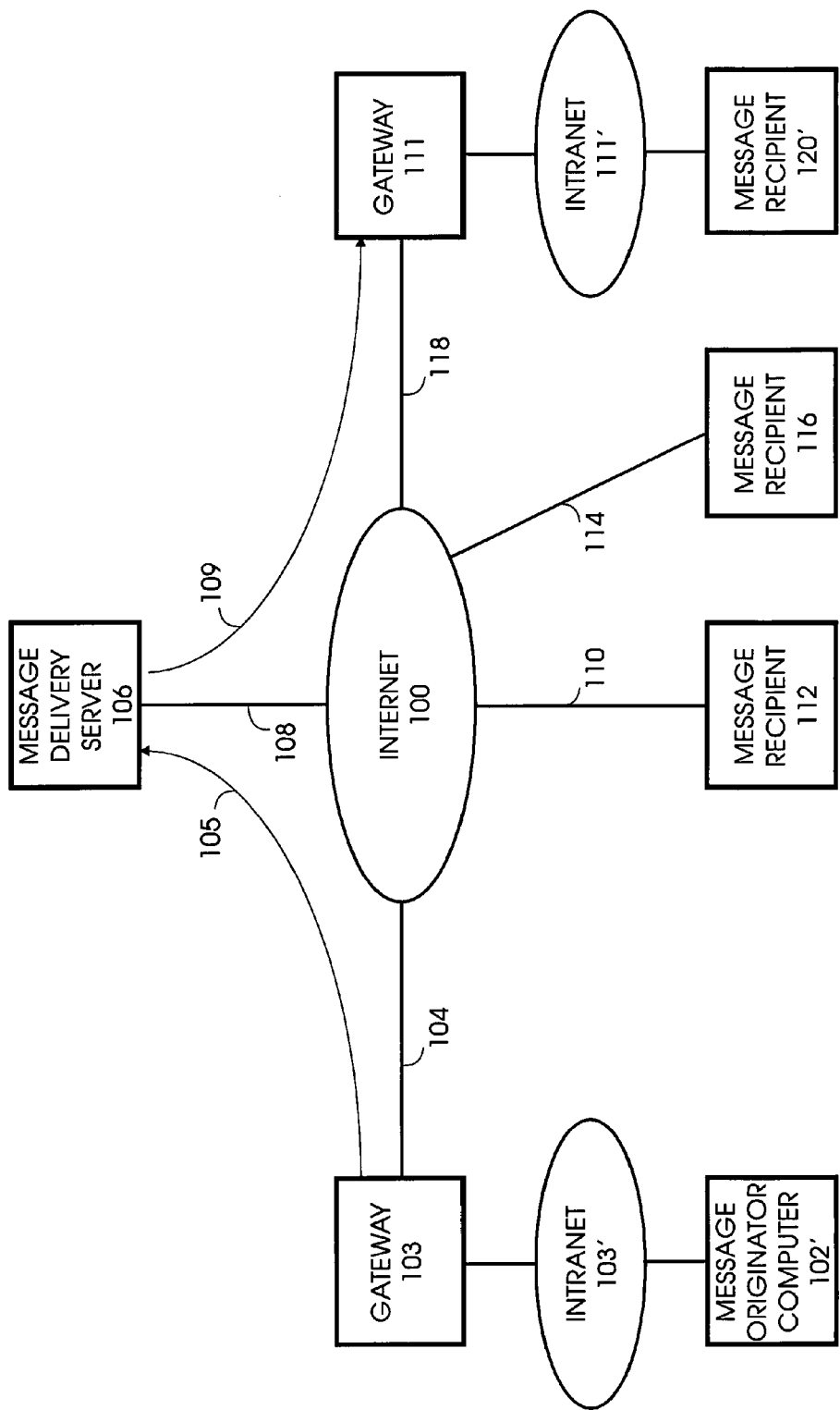
FIG. 1B is a network diagram of a second embodiment of the invention.

FIG. 1B is a network diagram of a second embodiment of the invention, wherein the gateway 103 waits a random time and then transmits a first encrypted phantom message over path 105 to the message delivery server 106. The gateway 103 is connected by intranet 103' to the message originator computer 102'. When the message originator computer 102' receives a user request to transmit a real message to the recipient computer 112, 116, or 120, it forwards the real message in cleartext over the intranet 103' to the gateway 103. When the gateway 103 receives the real message, the gateway 103 waits a random time and then encrypts and transmits the real message over path 105 to the message delivery server 106. The message delivery server 106 decrypts the messages and distinguishes the real message. FIG. 1B also shows the gateway 111 connected by the intranet 111' to the message recipient computer 120'. When the message delivery server 106 recognizes a message as a real message, it re-encrypts the real message and forwards it over path 109 to the gateway 111, which then forwards the message to the intended recipient computer 120'. The message delivery server 106 may intersperse the real message with phantom messages, sending them over path 109 to the gateway 111. The gateway 111 then decrypts the messages, distinguishes the real message, and forwards the real message in cleartext to the intended recipient computer 120'.

There are a wide variety of network configurations of the invention. In its simplest form, the originator computer 102 of FIG. 1A is directly connected over a communications link 104 to the recipient computer 120 which is able to distinguish phantom messages from real messages sent from the originator and discard the phantom messages. In another configuration, originator computer 102 of FIG. 1A is directly connected over a plurality of communications links 110, 114, and 118 to a plurality of recipient computers 112. 116, and 120, respectively, each of which is able to distinguish phantom messages from real messages sent from the originator and discard the phantom messages. In still another configuration, originator computer 102' of FIG. 1B is directly connected to a gateway 103 and sends only real messages to the gateway 103. The gateway 103 sends phantom messages and forwards the real messages over link 104 from the originator 102'. The gateway 103, in turn is directly connected over a communications link 104 to the recipient computer 112 which is able to distinguish phantom messages from real messages sent from the gateway 103 and discard the phantom messages. The gateway 103 may be directly connected over a plurality of communications links 110 and 114 to a plurality of recipient computers 112 and 116, respectively, each of which is able to distinguish phantom messages from real messages sent from the gateway 103 and discard the phantom messages. In still another configuration, the recipient computers, such as 120', may be directly connected to a second gateway 111 connected to the communications link 104, the second gateway 111 forwarding only real messages to the recipients 120'. In each of these configurations, a message delivery server 106 that can distinguish between real and phantom messages can be a part of the communications link between the originator computer or its gateway and the recipient computer or its second gateway. The message delivery server 106 distinguishes real messages and forwards them to the recipient computer or second gateway. Meanwhile, the message delivery server 106 can also be transmitting encrypted phantom messages to the recipient computer or second gateway.

Another feature of the invention is the use of phantom addresses to direct phantom messages to a pool of recipient computers that are able to recognize and discard them. The phantom address of a phantom message is meant to spoof an eavesdropper into believing that messages are being widely broadcast from the originator computer to many recipients, thereby concealing the identity of the true recipient of a real message. In an example configuration, originator computer 102 of FIG. 1A is directly connected over a plurality of communications links 110, 114, and 118 to a plurality of recipient computers 112, 116, and 120, respectively, each of which is able to distinguish phantom messages from real messages sent from the originator and discard the phantom messages. The originator computer 102 uses phantom addresses to direct phantom messages to the plurality of recipient computers 112, 116, and 120 to make it appear that messages are being widely broadcast from the originator computer 102.

Figure 2:
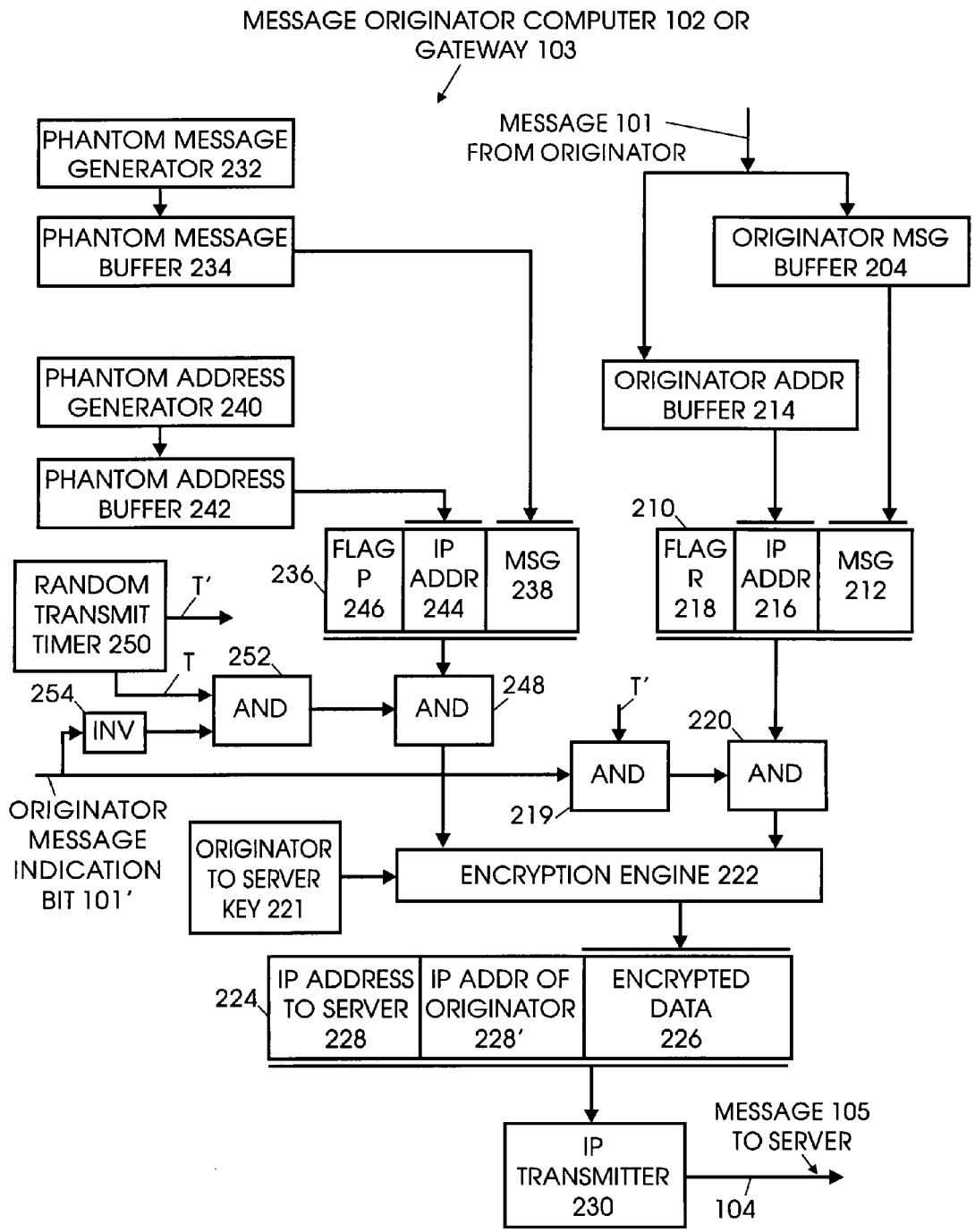
FIG. 2 is a more detailed logic block diagram of a hardware embodiment of the message originator computer.

FIG. 2 is a more detailed logic block diagram of a hardware embodiment of the message originator computer 102 or the gateway 103. A phantom message generator 232 generates phantom messages which are temporarily buffered in the phantom message buffer 234. Then the message buffer 234 outputs phantom messages to the message field 238 of the register 236. Phantom address generator 240 generates phantom addresses which are temporarily stored in the phantom address buffer 242 which are then output to the IP address field 244 of the register 236. A phantom flag P is stored in field 246 of register 236. The contents of register 236 are applied to one input of the AND gate 248. A random transmit timer 250 has two random transmit time pulses T and T'. The output T is applied to one input of the AND gate 252, the output of which is applied to a second input of the AND gate 248. The originator message indication bit 101' is normally off if there is no real message to be sent by a user. The inverter 254 therefor applies an enabling pulse to the other input, the AND gate 252 thereby providing an enabling signal to the AND gate 248. This causes the contents of the register 236 to be applied to the encryption engine 222. The originator to server key 221 is used as the key for the encryption engine 222, which encrypts the concatenated expression of the flag P, the IP address and the message in the register 236 and inputs the encrypted phantom message in the encrypted data field 226 of the register 224. The IP address to the message delivery server 106 is stored in field 228 and the IP address of the originator 102 is stored in field 228' of the register 224. The combination of the IP addresses and the encrypted data is output from the register 224 to the IP transmitter 230 which outputs the message 105 on link 104 to the Internet 100 and then to the message delivery server 106. When the message originator computer receives a user request to transmit a real message to a recipient computer, the message 101 from the originator is applied as the originator message portion to the originator message buffer 204 and the originator address to the originator address buffer 214. The originator message is then applied to the message field 212 and the originator address is applied to the IP address field 216 of the register 210. The real flag R is stored in field 218 of register 210. The contents of the register 210 represents a real message. The real message in register 210 is applied to one input of the AND gate 220. The random transmit time 250 output pulse T' is applied as an input to the AND gate 219. A second input to the AND gate 219 is the originator message indication bit 101'. When the message 101 is input from a user, the originator message indication bit 101' satisfies the AND gate 219 when a time pulse T' is applied and an enabling signal is output to the AND gate 220 which therefore passes the real message from the register 210 to the encryption engine 222. The originator to server key 221 for the encryption engine 222 encrypts the real message and applies it to the encrypted data field 226 of the register 224. The IP address to server 228 contains the IP address of the message delivery server 106. The contents of the register 224 is then applied to the IP transmitter 230 which sends the real message with the IP address as message 105 over a link 104 to the Internet 100 and then to the message delivery server 106.

Figure 3:
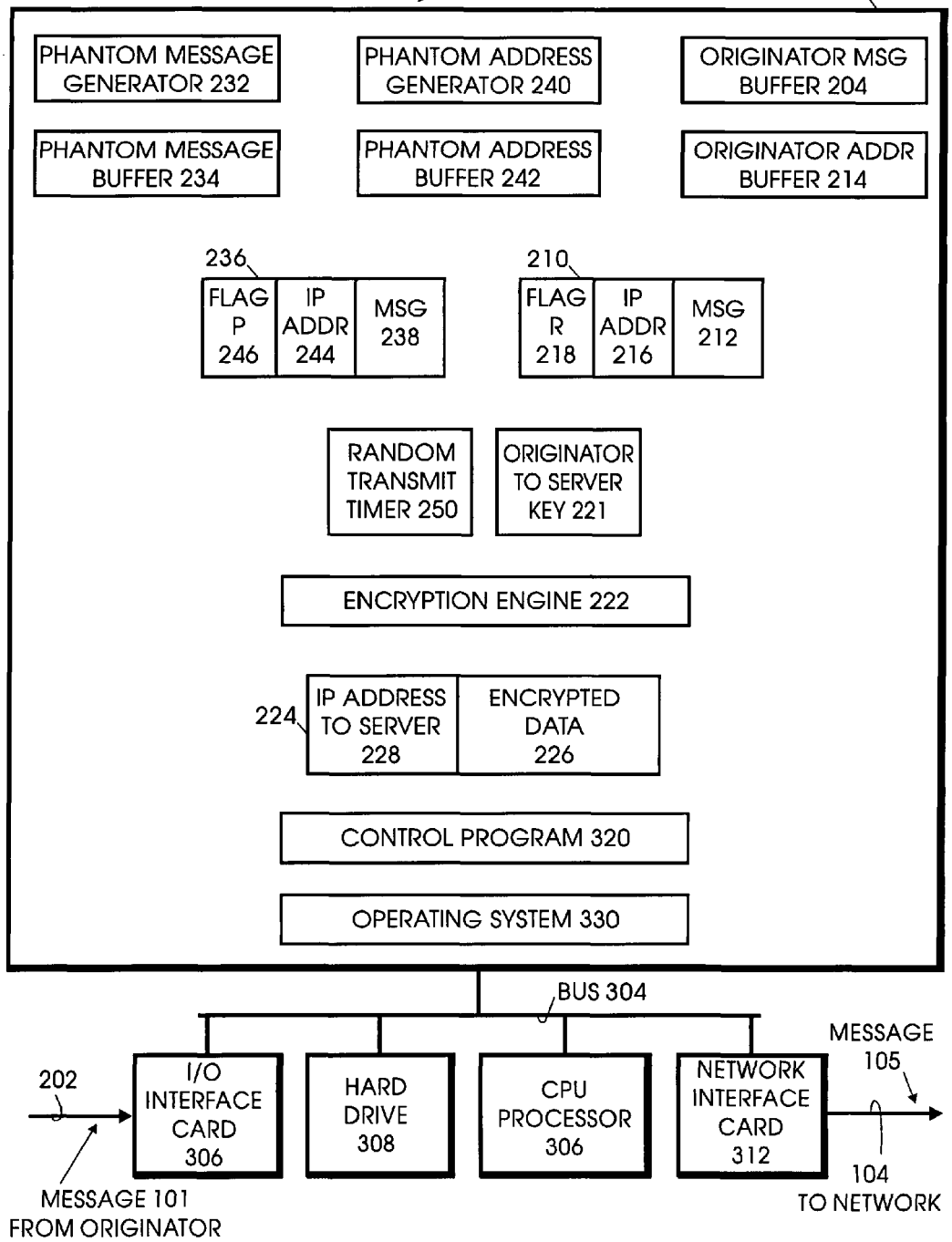
FIG. 3 is a more detailed functional diagram of a software embodiment of the message originator computer.

FIG. 3 is a more detailed functional diagram of a software embodiment of the message originator computer. FIG. 3 illustrates the message originator computer 102 or gateway 103 layout of the computer memory. The computer 102 or gateway 103 includes the memory 302 which is connected by means of the bus 304 to the I/O interface card 306 which is connected to the input 202 which carries the message 101 from the originator. Also connected to the bus 304 is the hard drive 308, the CPU processor 306, and the network interface card 312 which is connected to the link 104 to the Internet network 100. Memory 302 includes the phantom address message generator 232, the phantom message buffer 234, phantom address generator 240, phantom address buffer 242, the originator message buffer 204, the originator address buffer 214, the register 236, the register 210, the random transmit timer 250, the originator to server key 221, the encryption engine 222, the register 224, the control program 320, and the operating system 330. The control program 320 is shown in the flow diagram of FIG. 4.

Figure 4:
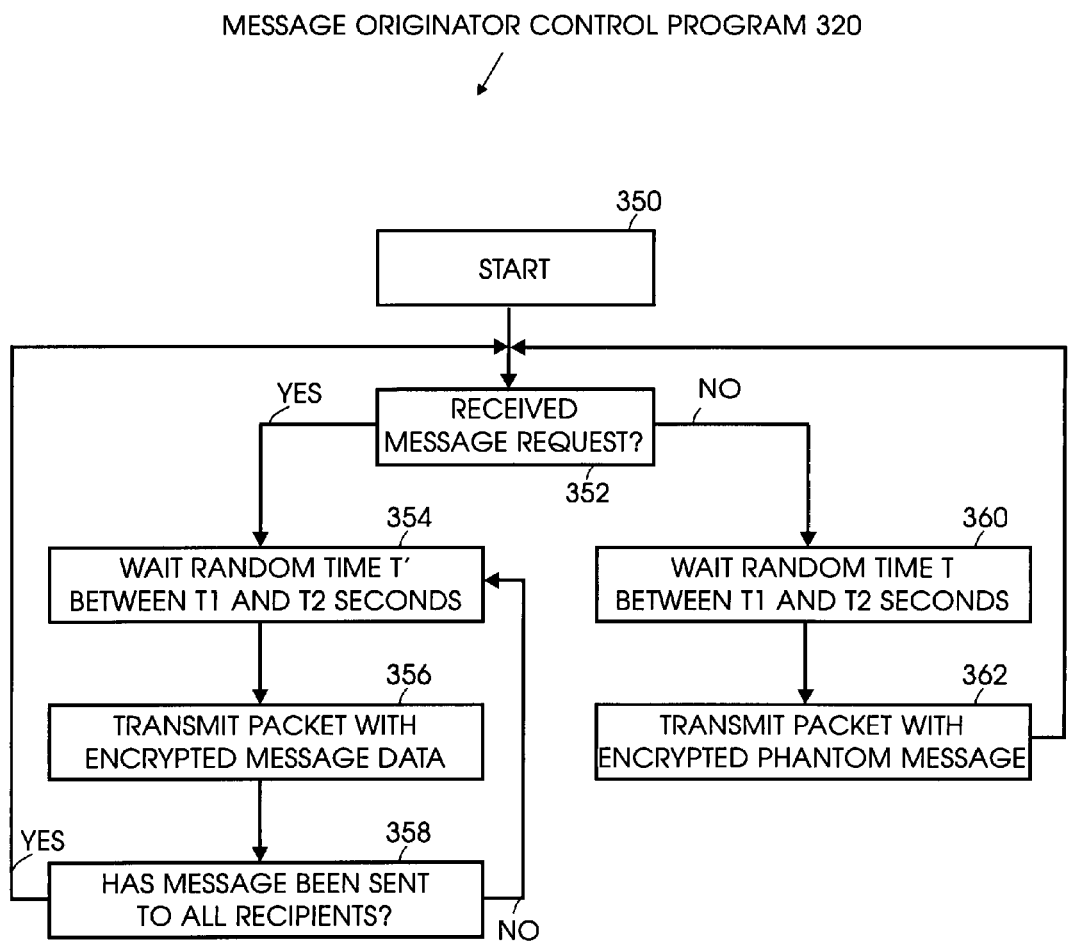
FIG. 4 is a flow diagram of the operation of the message originator control program.

FIG. 4 is a flow diagram of the operation of the message originator control program 320. Step 350 starts the method which proceeds to step 352 which decides whether a message request has been received from a user. If yes, then the program flows to step 354 wherein the originator computer 102 waits a random time T' between a first value T1 and a second value of T2 seconds. Then the program flows to step 352 which transmits a packet with the encrypted message data 356 which is the real message. Then the program flows to step 358 which determines if the message has been sent to all intended recipients. If no, then the flow loops back to step 354. If yes, then the flow loops back to step 352. If step 352 determines that the message request has not been received, then phantom messages will be transmitted. The program flows to step 360 which waits a random time T between a first value T1 and a second value T2 seconds. Then the program flows to step 362 which transmits a packet with an encrypted phantom message to the message delivery server 106. Then the program flows back to step 352.

Figure 5:
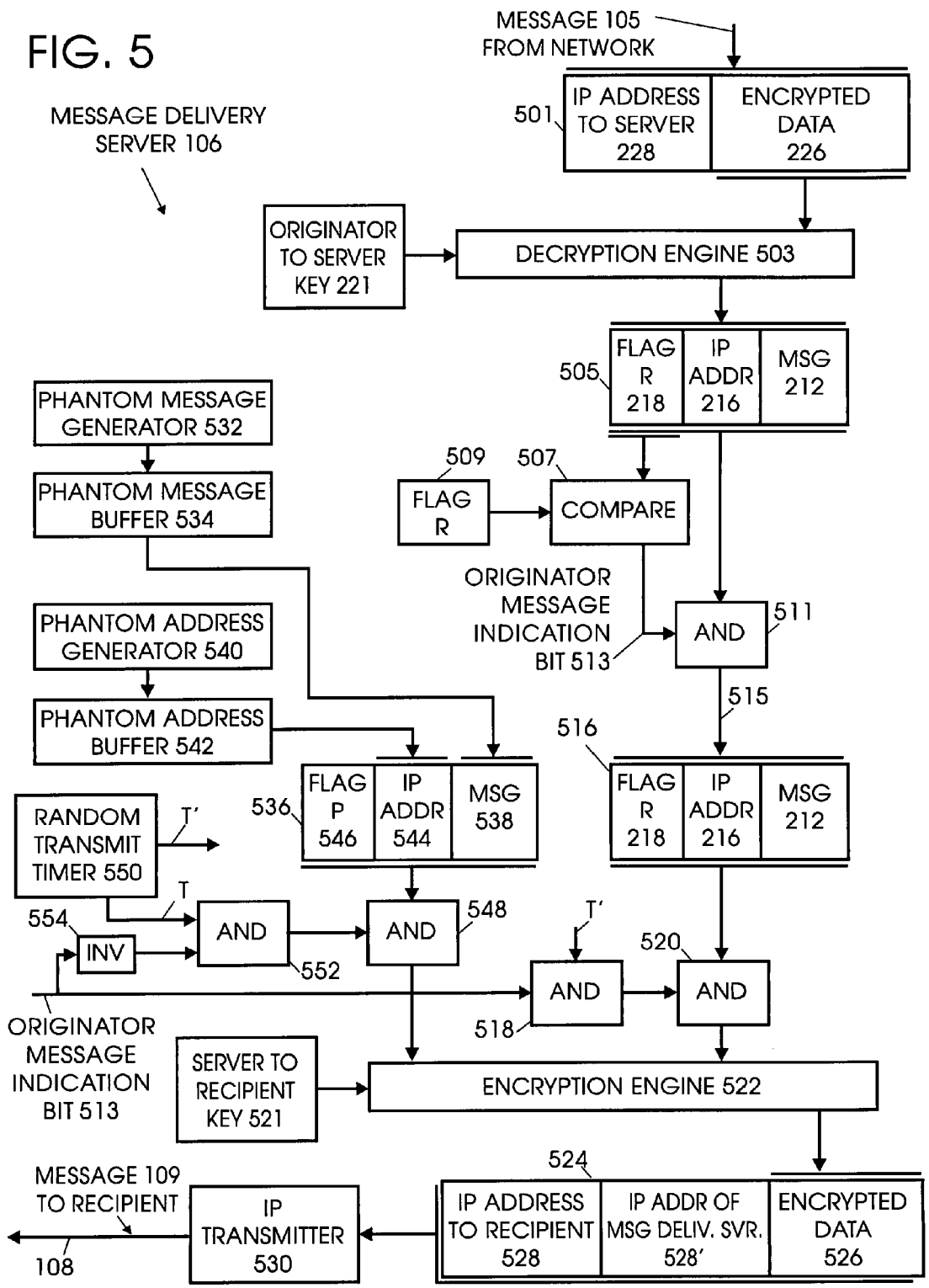
FIG. 5 is a more detailed logic block diagram of a hardware embodiment of the message delivery server.

FIG. 5 is a more detailed logic block diagram of a hardware embodiment of the message delivery server 106. When the message 105 arrives over link 108 from the Internet 100, it is loaded into the register 501 with the encrypted data in field 226 and the IP address to server in field 228. Then the encrypted data in field 226 is applied to the decryption engine 503 which uses the originator to server key 221 to decrypt the encrypted data and apply it to the register 505. This could either be a real message or it could be a phantom message. The value of the flag received in the message 105 is stored in field 218. This could either be the real flag R or it could be the phantom flag P. This value will be compared in the comparator 507 with the actual value of the real flag R stored in 509, and if a real flag R is detected, this will be an originator message indication bit 513 which is output from the compare 507 to one input of the AND gate 511. The other input of the AND gate 511 is connected to the register 505 which contains the decrypted message 105. If the decrypted message 505 is determined to be a real message by the comparator 507, then the real message is passed through the AND gate 511 over path 515 to the register 516. Alternately, if the message 505 is a phantom message, then the compare 507 will not successfully compare the real flag R stored at 509 with the P flag buffered in field 218 of register 505, and the phantom message received at 105 will be discarded. The originator message indication bit 513 is applied to one input of the AND gate 518, the other input of which is a time pulse T' output from the random transmit timer 550. If the originator message indication bit 513 indicates that a real message has been received at 105, then the AND gate 518 enables the AND gate 520 to pass the contents of the register 516, which is the real message, to the encryption engine 522. The server to recipient key 521 is used by the encryption engine 522 to encrypt the real message and it is loaded into the field 526 of the register 524. The IP address 528 to the recipient, such as the message recipient computer 120, and the return IP address 528' of the message delivery server, are combined with the encrypted data in field 526 and applied to the IP transmitter 530, which outputs the message 109 over the link 108 to the Internet for delivery to the message recipient computer 120.

In one embodiment of the invention, if a phantom message has been received at 105 from the message originator computer 102, then the message delivery server 106 will generate a new phantom message for transmission to a randomly selected message recipient computer 112, 116 or 120. In FIG. 5, the phantom message generator 532 generates a phantom message which is temporarily stored in the phantom message buffer 534 and then applied to the field 538 of the register 536. The phantom address generator 540 generates a phantom address which can be randomly selected as the address of either the message recipient computer 112, 116, or 120, and this phantom address value is temporarily stored in the phantom address buffer 542 and then applied to the IP address field 544 of the register 536. The phantom flag P is stored in field 546 of the register 536. When the originator message indication bit 513 indicates that no real message has been received at 105, then the inverter 554 is enabled applying an enabling signal to the AND gate 552 thereby allowing the passage of the timing bit T from the random transmit timer 550 to the AND gate 548. This enables the path from the register 536 containing the newly formed phantom message to the encryption engine 522. The server to recipient key 521 is used to encrypt the new phantom message in the encryption engine 522 which is loaded into the encrypted data field 526 of the register 524. The IP address to recipient 528 can be a random value for the message recipient 112, 116 or 120, or it can be a predetermined address on the network. The IP address and the encrypted data in register 524 are applied to the IP transmitter 530 which transmits the message 109 over the link 108 to the Internet 100 and then to the addressed recipient.

Figure 6:
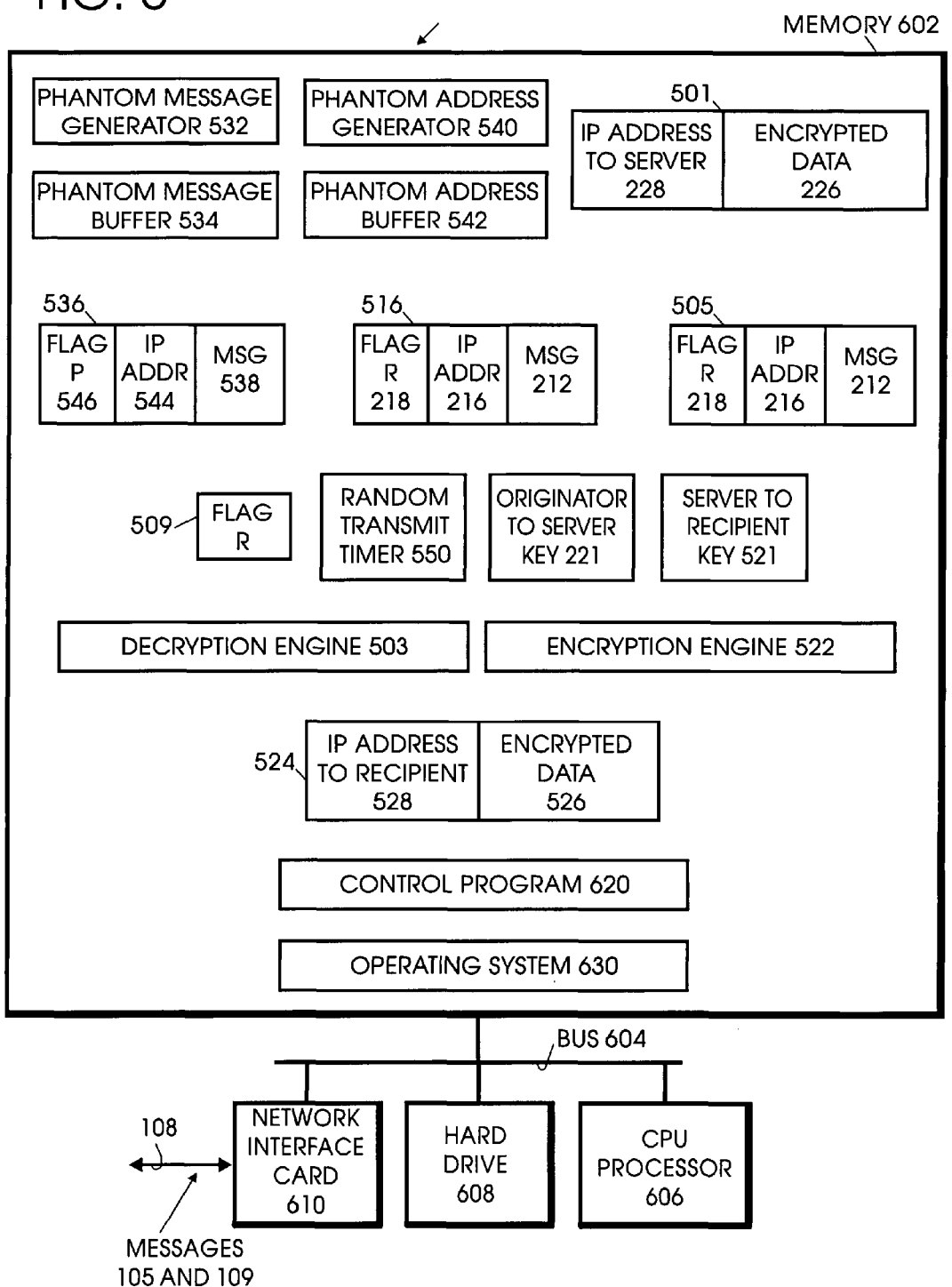
FIG. 6 is a more detailed functional diagram of a software embodiment of the message delivery server.

FIG. 6 is a functional diagram of a software embodiment for the message delivery server computer 106. The message delivery server computer 106 includes the memory 602, which is connected by means of the bus 604 to the network interface card 610 which is connected to link 108 for exchange of the messages 105 and 109. The hard drive 608 and the CPU processor 606 are also connected to the bus 604. The memory 602 includes the phantom message generator 532, phantom message buffer 534, the phantom address generator 540, the phantom address buffer 542, the register 501, register 536, register 516, register 505, register 509, random transmit timer 550, the originator to server key 221, the server to recipient key 521, the decryption engine 503, the encryption engine 522, the register 524, the control program 620, and the operating system 630. The control program 620 is shown in more detail in the flow diagram of FIG. 7.

Figure 7:
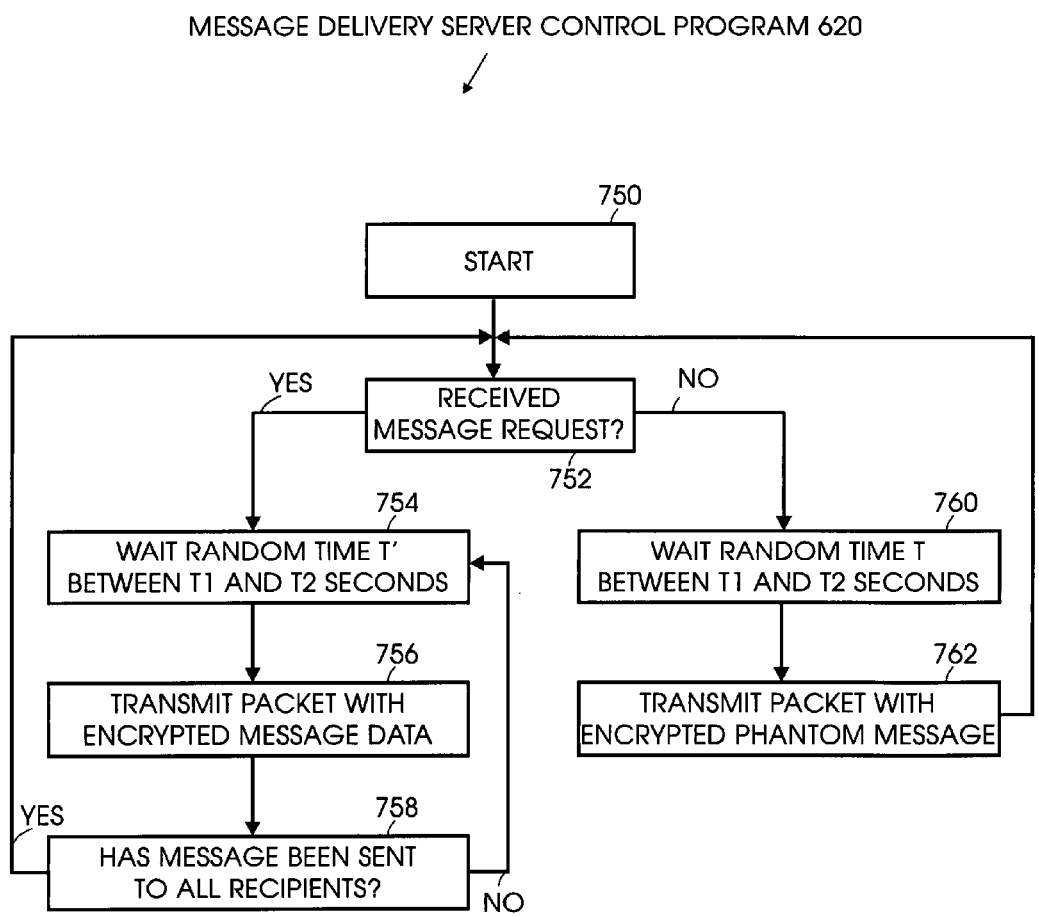
FIG. 7 is a flow diagram of the operation of the message delivery server control program.

FIG. 7 is a flow diagram of the operation of the message delivery server control program 620. The program starts at step 750 which flows to step 752 which determines whether a message request has been received. If a message request has been received, then the program flows to step 754 which waits a random time T' between T1 and T2 seconds. Then the program flows to step 756 which transmits a packet with the encrypted message data which is the real message. Then the program flows to step 758 which determines whether a message has been sent to all intended recipients. If NO, then the program flows back to step 754. If YES, then the program flows back to step 752. If step 752 determines that a message request has not been received, then a phantom message will be transmitted. The program flows to step 760 which waits a random time T between a first value T1 and a second value of T2 seconds. Then the program flows to step 762 which transmits a packet with an encrypted phantom message to a recipient. Then the program flows back to step 752.

Figure 8:
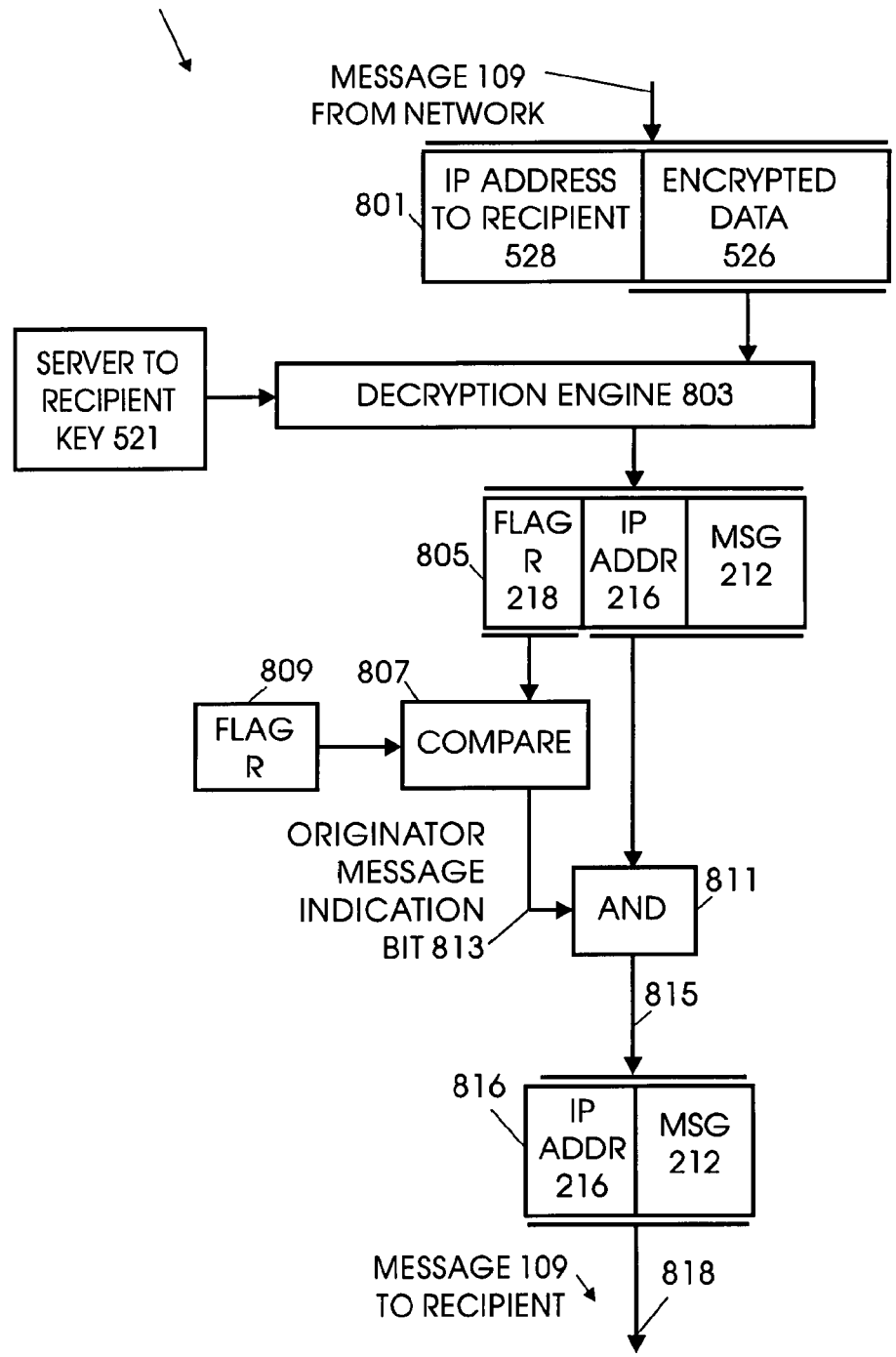
FIG. 8 is a more detailed logic diagram of a hardware embodiment of the message recipient computer.

FIG. 8 is a logic diagram of a hardware embodiment of the message recipient computer 120 or the gateway 111. When the message 109 is received from the network, it is buffered in the register 801. Encrypted data is in the field 526 and the IP address to recipient is the field 528. The encrypted data is applied to the decryption engine 803 which uses the server to recipient key 521 to decrypt the received message. The received message can either be a phantom message or a real message. In either case, the decrypted message is loaded into the register 805 and the value of the flag in field 218 is compared by the comparator 807 with the value of the real flag R in register 809. If the compare is successful, then the originator message indication bit 813 is enabled which is applied to one input of the AND gate 811, thereby enabling the AND gate 811 to pass the message field 212 and the IP address field 216 from the register 805 to the register 815. Thus, the contents of the register 816 is the decrypted message 109 to the recipient, which includes the IP address in field 216 and the message in field 212. This message 109 is then output on the link 818 to the local recipient.

Figure 9:
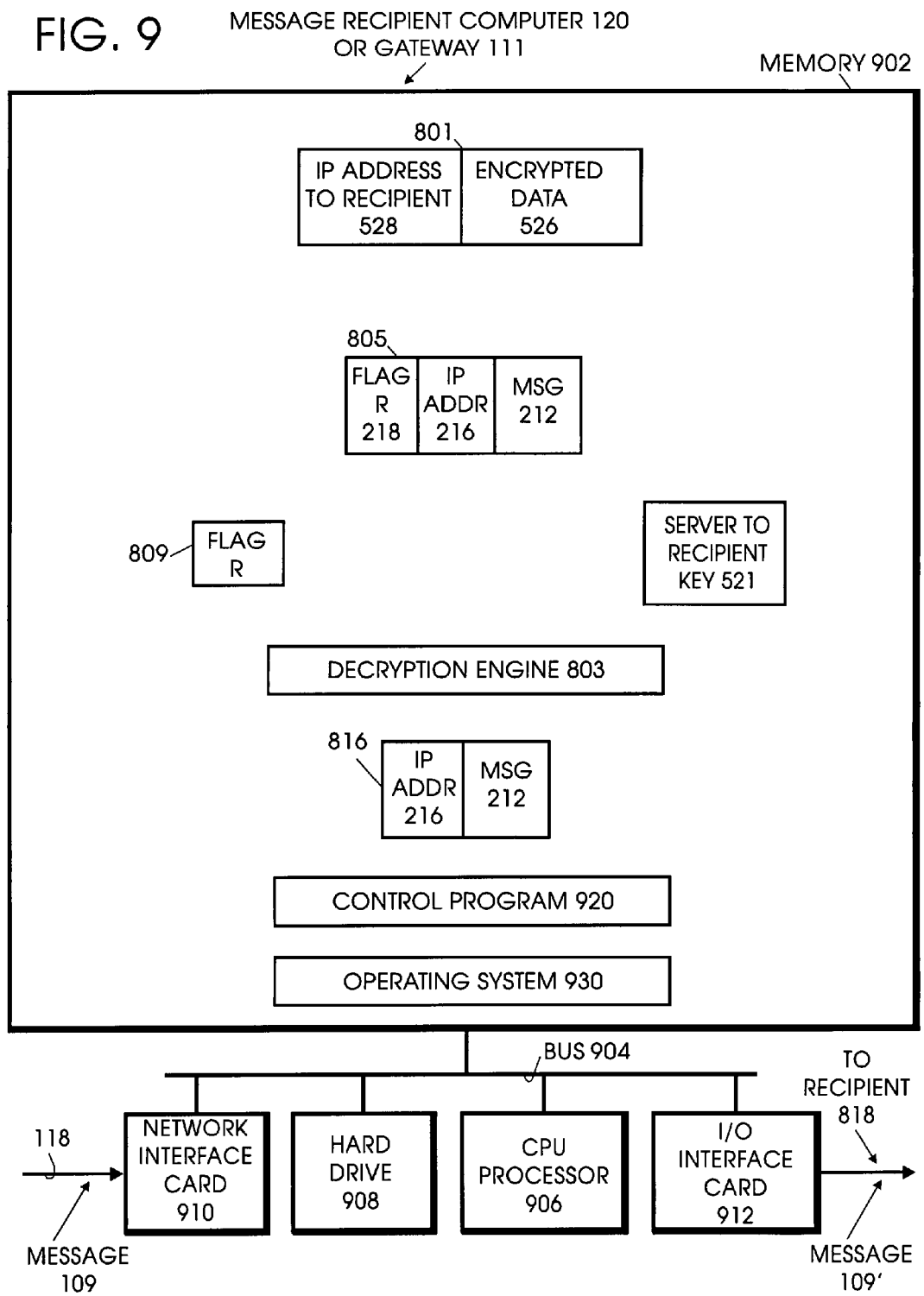
FIG. 9 a more detailed functional diagram of a software embodiment of the message recipient computer.

FIG. 9 is a functional diagram of a software embodiment of the message recipient computer 120 or the gateway 111. The memory 902 is connected by means of the bus 904 to the network interface card 910 which is connected to the link 118 for the receipt of the message 109. Also connected to the bus 904 is the hard drive 908, the CPU processor 906, and the I/O interface card 912 which is connected to the recipient on line 818 for the delivery of the message 109'. Memory 902 includes the register 801, the register 805, the register 809, the server to recipient key 521, the decryption engine 803, the register 816, the control program 920, and the operating system 930.

Figure 10:
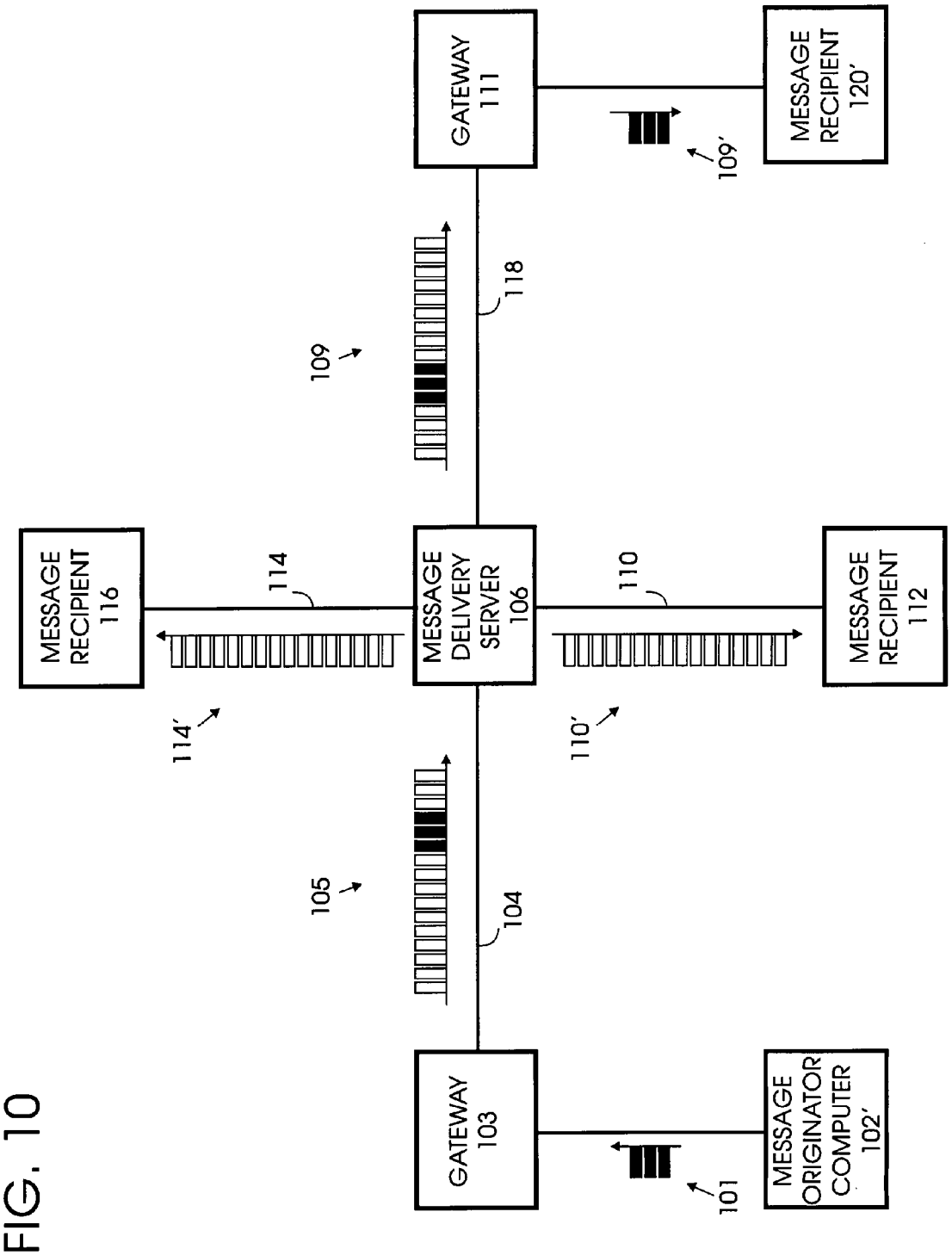
FIG. 10 is a data flow diagram illustrating the paths of phantom and real messages.

FIG. 10 is a data flow diagram illustrating the paths of phantom and real messages in the network. In relation to the network diagram of FIG. 1B, the message originator computer 102', will initiate a real message 101 which is delivered to the gateway 103. The gateway 103 has been transmitting phantom messages on the link 104 to the message delivery server 106 and now processes the real message 101 to be included along with the phantom messages on the link 104 to the message delivery server 106. In the meantime, the message delivery server 106 has been delivering phantom messages 110' over link 110 to the message recipient 112 and has been delivering phantom messages 114' over the link 114 to the message recipient 116. The message delivery server 106 receives the combination of phantom messages and real messages 105 from the gateway 103 on link 104, and passes the real message 101 on link 118 to the gateway 111. This is done by inserting the real message 101 into the sequence of phantom messages to form the sequence 109 on link 118 delivered from the message delivery server 106 to the gateway 111. The gateway 111 strips off the phantom messages and then delivers the real message 109' to the message recipient 120'.

Various illustrative examples of the invention have been described in detail. In addition, however, many modifications and changes can be made to these examples without departing from the nature and spirit of the invention

What is claimed is:

1. A method for secure electronic mail delivery comprising:
    periodically transmitting encrypted phantom messages to a computer, each of the encrypted phantom messages comprising an encrypted cleartext message, the cleartext message being a stale message drawn from a pool of past messages sent to the computer; and
    transmitting an encrypted real message to the computer interspersed in transmission of the encrypted phantom messages.

2. The method of claim 1 further comprising:
    generating the encrypted phantom messages.

3. The method of claim 2 wherein the encrypted cleartext message has an outward appearance similar to an encrypted real message.

4. The method of claim 1 wherein the computer is a message delivery server which forwards encrypted real messages to a receiving computer.

5. The method of claim 4 wherein the message delivery server also transmits encrypted phantom messages to the receiving computer.

6. The method of claim 4 wherein the message delivery server is able to distinguish encrypted phantom messages from encrypted real messages and discard the encrypted phantom messages.

7. An apparatus comprising:
    a processor; and
    a memory to store computer program instructions, the computer program instructions when executed on a processor cause the processor to perform operations comprising:
        periodically transmitting encrypted phantom messages to a computer, each of the encrypted phantom messages comprising an encrypted cleartext message, the cleartext message being a stale message drawn from a pool of past messages sent to the computer; and
        transmitting an encrypted real message to the computer interspersed in transmission of the encrypted phantom messages.

8. The apparatus of claim 7, the operations further comprising:
    generating the encrypted phantom messages.

9. The apparatus of claim 8 wherein the encrypted cleartext message has an outward appearance similar to an encrypted real message.

10. The apparatus of claim 7 wherein the computer is a message delivery server which forwards encrypted real messages to a receiving computer.

11. The apparatus of claim 10 wherein the message delivery server also transmits encrypted phantom messages to the receiving computer.

12. The apparatus of claim 10 wherein the message delivery server is able to distinguish encrypted phantom messages from encrypted real messages and discard the encrypted phantom messages.

13. A computer readable storage device storing computer program instructions which, when executed on a processor, cause the processor to perform operations comprising:
    periodically transmitting encrypted phantom messages to a computer, each of the encrypted phantom messages comprising an encrypted cleartext message, the cleartext message being a stale message drawn from a pool of past messages sent to the computer; and
    transmitting an encrypted real message to the computer interspersed in transmission of the encrypted phantom messages.

14. The computer readable storage device of claim 13, the operations further comprising:
    generating the encrypted phantom messages.

15. The computer readable storage device of claim 14 wherein the encrypted cleartext message has an outward appearance similar to an encrypted real message.

16. The computer readable storage device of claim 13 wherein the computer is a message delivery server which forwards encrypted real messages to a receiving computer.

17. The computer readable storage device of claim 16 wherein the message delivery server also transmits encrypted phantom messages to the receiving computer.

\* \* \* \* \*